United States Patent

[11] 3,616,959

| [72] | Inventors | Francis Remesy;<br>Jean Vaillant, both of Route Nationale, St.<br>Marcel, Marseille, France |
|---|---|---|
| [21] | Appl. No. | 825,219 |
| [22] | Filed | May 16, 1969 |
| [45] | Patented | Nov. 2, 1971 |
| [32] | Priority | May 17, 1968 |
| [33] | | France |
| [31] | | 22288 |

[54] CONTAINER
8 Claims, 4 Drawing Figs.

[52] U.S. Cl. .................................................. 220/12, 220/69
[51] Int. Cl. .................................................. B65d 57/00
[50] Field of Search ........................................ 220/12, 10, 15, 9 A, 9 LG, 69; 206/46 M; 248/54, 55

[56] References Cited
UNITED STATES PATENTS

| 2,287,198 | 6/1942 | Sandberg | 220/1 B UX |
| 2,594,586 | 4/1952 | Ries | 206/46 X |
| 2,674,370 | 4/1954 | Iredell | 206/46 |
| 2,717,017 | 9/1955 | Feasey | 206/46 X |
| 2,858,136 | 10/1958 | Rind | 220/15 X |
| 3,154,212 | 10/1964 | Brush | 220/15 |
| 3,339,782 | 9/1967 | Segura et al. | 220/15 |
| 3,446,388 | 5/1969 | Greenberg | 220/15 |
| 3,460,706 | 8/1969 | Hoover | 220/15 |

FOREIGN PATENTS

| 1,305,256 | 8/1962 | France | 220/1 B |
| 1,535,681 | 7/1968 | France | 220/1 B |

Primary Examiner—Joseph R. Leclair
Assistant Examiner—James R. Garrett
Attorney—William Anthony Drucker ABSTRACT: The invention provides a heat-insulated container for transcontinental transportation of liquids comprising a tank body and a rigid cradle to support the body, anchoring means being disposed at spaced points on the body and cradle to locate the body with respect to the cradle, the anchoring means including thermal insulation interposed between the tank body and the cradle, and some of the anchoring means being constructed to allow expansion and contraction of the tank body with respect to the cradle.

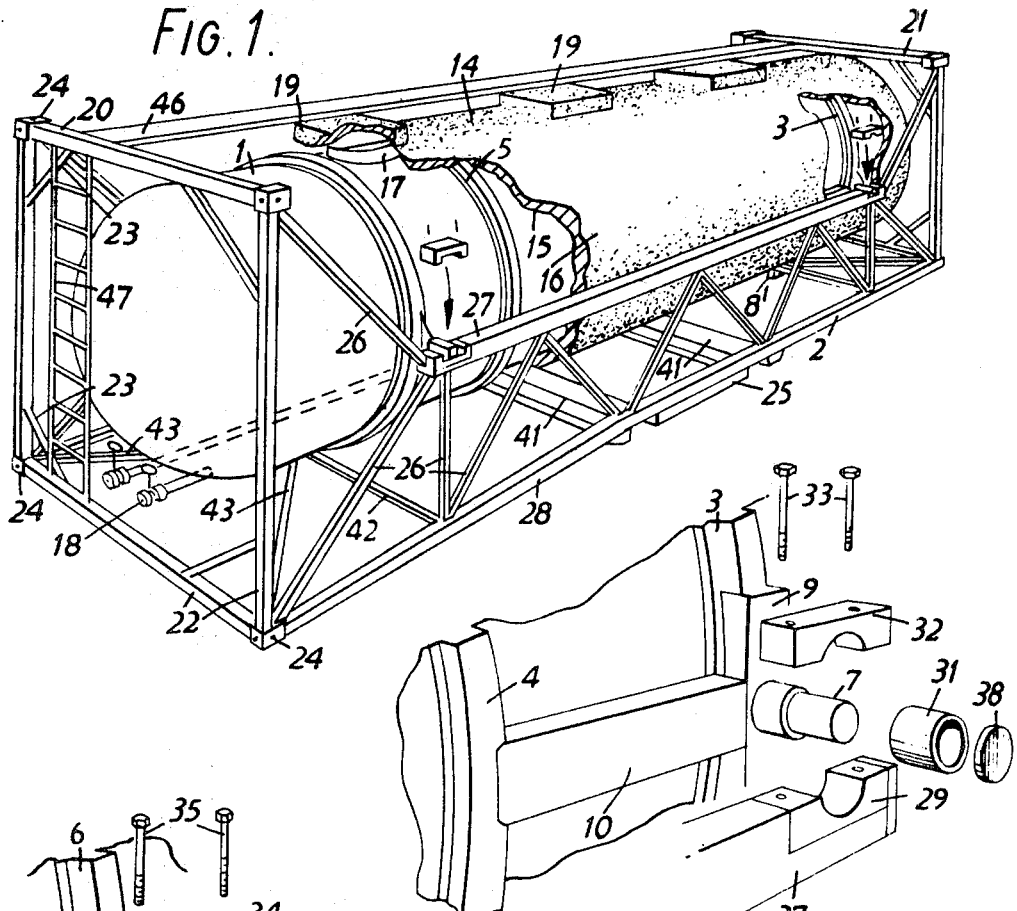
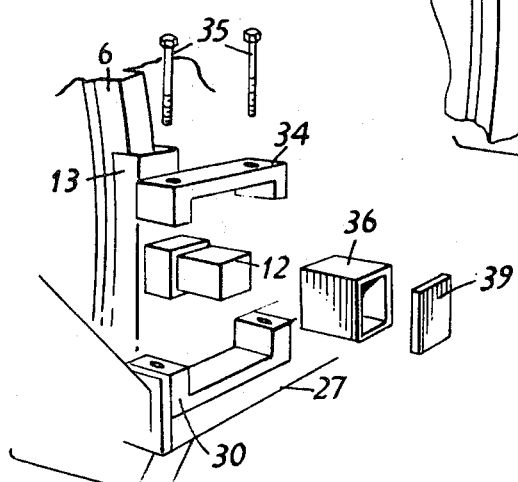
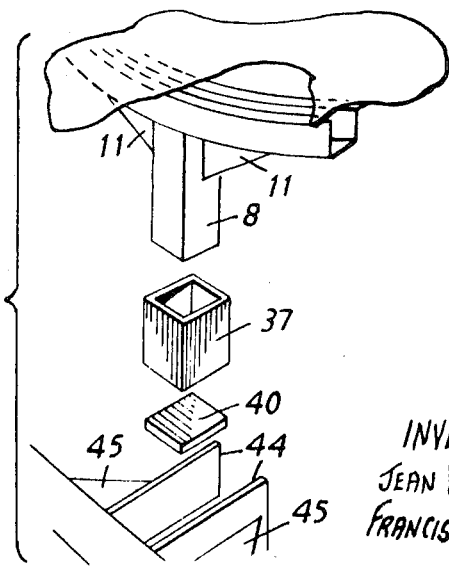
INVENTORS:
JEAN VAILLANT
FRANCIS REMESY

CONTAINER

The invention consists of the construction of tanker containers designed for the transcontinental transport by sea, air, rail or other means, and by road, of liquid products which have to be kept within narrow temperature limits during the whole of the journey, but which despite the functional constructional features retain the standards conforming to the various regulations, and which are fitted with lifting or handling accessories.

It features the means used taken either as a whole or separately, and in particular the combination of the tanker body braced by external rings, structured and insulated, connected to the carrying cradle fitted with support and lifting gear made up of tubular bars of appropriate structure, arranged in the form of a trellis transmitting the stresses occurring in the tank supports to the anchoring units of the outer frames, through a limited number of journals borne by the tank rings emerging from the insulating and thermally insulated envelope, some of which permit the tank to slide slightly in order to compensate its expansion, itself stabilized by a thermal device.

It is moreover specified that the hollow reinforcing rings can be used as diffusing collectors of a cold or hot fluid designed to compensate calorific variations, and distributed by an autonomous unit also borne by the cradle.

In the accompanying drawings, which show a nonlimiting example of construction of the invention:

FIG. 1 shows the tank as a whole,

FIG. 2 gives an exploded view, on a different scale, of an insulating envelope and a detail of one of the two fixed supports maintaining the tank on a cradle, FIG. 3 similarly shows a detail of one of two horizontal sliding supports, FIG. 4 also similarly shows a detail of one of the two vertical sliding supports.

The tanker container (FIG. 1) is made up of the container 1, the cradle 2. The tank 1 is made of thin carbon steel sheet, stainless steel or aluminum alloy or any other material according to the liquid to be transported.

It is braced externally by the rings 3, 4, 5, 6 welded on the container.

The ring 3, FIG. 2, comprises at each side a horizontal, circular section journal 7. At the bottom, it is fitted with a vertical, square section journal 8, FIG. 4.

The connection of the journal 7 to the ring 3 is completed by the vertical U-shaped reinforcement 9 and by the reinforcement 10 which connects the rings 3, 4 longitudinally. The connection of the journal 8 to the ring 3 is completed by the stay plates 11.

The ring 6 similarly comprises on the right and left two horizontal, square section journals 12 (FIG. 3) and at the bottom a vertical journal 8 also square in section. Connection of the journal 12 to the ring 6 is completed by the vertical U-shaped reinforcement 13.

To keep the liquid transported at a constant temperature, the tank 1 is completely covered by an insulating cover 14 made up of a thick layer 15 of plastic foam, fiberglass or other, and a fluidtight external envelope 16 made of steel, aluminum or reinforced plastic material.

The filling inlets 17 and the drain cocks 18 are covered by the casings 19 made of the same insulating material.

The journals 7, 8, 12 which constitute the tank's only attachment points emerge from the insulating shell 14, and are themselves thermally insulated by sleeves 31, 36, 37. The sheaths 36, 37 and the stoppers 38, 39 and 40 are made of strong, insulating plastic material.

The cradle 2 comprises two end frames 20 and 21 made up of tubular bars 22, crosspieces 23 and cornerpieces 24 comprising grooves and arranged in accordance with the standards laid down in the various regulations.

These two frames 20 and 21 are connected to each other by two longitudinal girders 25, on the right and the left, made up of a trellis of tubular bars 26 and upper 27 and lower 28 members.

The upper member 27 bears the pillow block 29 on which the tank 1 rests by means of the journal 7 and the sleeve 31, the whole being held by the cap 32 and the screws 33, FIG. 2.

The member 27 also bears the sliding pillow block 30 on which the tank 1 bears vertically by means of the journal 12 fitted with a sheath 36 and retained by the cap 34 and the screws 35, FIG. 3.

The cylindrical shape of the journal 7, the sheath 31, the pillow block 29 and the cap 32, allow the tank to be immobilized vertically and longitudinally.

The square shape of the journal 12 and the sheath 36 and the flat shape of the pillow block 30 and the cap 34 allow the tank to be fixed vertically, while allowing it to slide longitudinally in order to compensate the variation in length or its contraction.

The lower members 28 on the right and left are cambered at the top so as to allow for two transversal slots 41 for the forks of lift trucks.

They are stayed on the lower plane at the two ends by the tubular bars 42 and 43. The bar 42 bears the guides 44 and the stay plates 45 on which the tank 1 rests transversally by means of the sliding vertical journal 8 fitted with its square sheath 37.

The cradle may also comprise a gangway 46 and an access ladder.

The tanker container thus formed has few points of contact with the ambient air and keeps the liquid transported within a narrow temperature margin for a long time, though it can expand freely.

A heat regulator unit can be used if the temperature of the liquid is very different from the ambient temperature. In this case, the tank 1 is made shorter than the cradle 2 at one end in the region of the ring 3 and journals 7 are fitted so as to allow the unit to be housed and supported by the end frame 21.

The fluid produced by the unit, designed to cool or heat the tank 1 is then distributed around the tank using the tubular chambers formed by the space between the rings 3, 4, 5, 6 and the tank's cover.

The rigidity of the cradle enables the tanker container to be handled either by the upper or lower corner pieces or by the fork slots, and enables it to stand up to all the omnidirectional pulls which occur during transport. The same applies to expansion.

The device described thus eliminates the constructional difficulties arising from the necessary connections between the tank and the auxiliary support and lifting units. It eliminates the causes of heat loss, notably at the attachment points. Finally, it avoids a concentration of stresses exceeding the strength of the thin sheets used to make the body of the tank.

Nevertheless the shapes, dimensions and positioning of the various parts may vary within the limits of the equivalents, as may the materials used to make them, without thereby altering the general concept of the invention just described.

We claim:

1. A container for transport of liquids comprising:
   a. a cylindrical tank of substantially circular cross section having its principal axis disposed horizontally;
   b. a support structure for said tank comprising substantially rectangular end frames disposed transversely of said tank, one adjacent each end, and connected by longitudinal members;
   c. a truss-supported pillow block between the longitudinal members, about midway between the top and bottom of the end frames, having an elongated top member; and
   d. at least two axially spaced apart annular bands around said tank having support means extending outwardly at diametrically opposite sides of said bands, said band support means resting upon said elongated top member and at least one pair of band support means being movable upon said top member.

2. A heat-insulated container, as claimed in claim 1 wherein the support structure comprises means to receive the fork members of a forklift device.

3. A container according to claim 1 which is heat insulated to maintain the temperature of the contents therein.

4. A container according to claim 1 in which heat transfer fluid is circulated through said annular bands.

5. A container according to claim 1 in which elongated bracing members connect the ends of the truss support member with the corners of the end frames.

6. A heat-insulated container, as claimed in claim 1 wherein the tank body comprises a tank of sheet material and a plurality of external reinforcing rings axially spaced on said tank, and anchoring means mounted on certain of said rings.

7. A heat-insulated container, as claimed in claim 6, comprising a heat-insulating jacket disposed about the tank and an envelope of sheet material about the jacket.

8. A heat-insulated container, as claimed in claim 6, comprising an envelope of sheet material disposed about the tank and defining, with the reinforcing rings, a space to receive fluid circulated in said space for affecting the temperature of the contents of the tank.